US011383368B2

(12) United States Patent
Comarmond

(10) Patent No.: US 11,383,368 B2
(45) Date of Patent: Jul. 12, 2022

(54) PERCUSSION APPARATUS PROVIDED WITH A CENTERING DEVICE

(71) Applicant: MONTABERT, Saint-Priest (FR)

(72) Inventor: Jean-Sylvain Comarmond, Vourles (FR)

(73) Assignee: MONTABERT, Saint-Priest (FR)

( * ) Notice: Subject to any disclaimer, the term of this patent is extended or adjusted under 35 U.S.C. 154(b) by 141 days.

(21) Appl. No.: 16/341,842

(22) PCT Filed: Sep. 26, 2017

(86) PCT No.: PCT/FR2017/052579
§ 371 (c)(1),
(2) Date: Apr. 12, 2019

(87) PCT Pub. No.: WO2018/069596
PCT Pub. Date: Apr. 19, 2018

(65) Prior Publication Data
US 2019/0314969 A1    Oct. 17, 2019

(30) Foreign Application Priority Data
Oct. 14, 2016    (FR) ...................................... 1659980

(51) Int. Cl.
 *B25D 9/26*        (2006.01)
 *B25D 9/14*        (2006.01)
(Continued)

(52) U.S. Cl.
CPC ............... *B25D 9/145* (2013.01); *B25D 9/18* (2013.01); *B25D 9/26* (2013.01);
(Continued)

(58) Field of Classification Search
CPC . B25D 9/145; B25D 9/18; B25D 9/26; B25D 2217/0023; B25D 2250/125;
(Continued)

(56) References Cited

U.S. PATENT DOCUMENTS 3,965,799 A * 6/1976 Juvonen ................. B25D 9/145
91/220
4,067,402 A * 1/1978 Schnell ................... E02D 7/125
173/137

(Continued)

FOREIGN PATENT DOCUMENTS

DE    102012013409 A1    11/2013
EP        0071546 A1     2/1983
(Continued)

OTHER PUBLICATIONS

English Machine Translation FR998513.
(Continued)

*Primary Examiner* — Robert F Long
(74) *Attorney, Agent, or Firm* — Cantor Colburn LLP

(57) ABSTRACT

This percussion apparatus includes a striking piston mounted so as to be displaced inside a piston cylinder and arranged to strike a tool; and a guide bearing comprising a guide surface configured to guide the striking piston during the displacements of the striking piston in the piston cylinder. The guide bearing includes a centering device configured to center the striking piston in the piston cylinder, the centering device comprising centering chambers formed in the guide surface and distributed around the striking piston, each centering chamber being fluidly connected to a high pressure fluid supply circuit; and at least one discharge groove formed in the guide surface of the guide bearing and located proximate to at least one of the centering chambers, the at least one discharge groove being fluidly connected to a low pressure circuit.

15 Claims, 2 Drawing Sheets

(51) Int. Cl.
*B25D 9/18* (2006.01)
*F16C 32/06* (2006.01)

(52) U.S. Cl.
CPC ............... *B25D 2217/0023* (2013.01); *B25D 2250/125* (2013.01); *F16C 32/06* (2013.01)

(58) Field of Classification Search
CPC ............. B25D 2250/231; B25D 9/12; B25D 2250/121; B25D 2250/331; B25D 9/04; F16C 32/06; F16C 2370/00; F16C 32/0659; F16C 2316/10; F16C 32/0655
USPC ............ 173/1–2, 13–17, 100–115, 124–129, 173/131–138, 141, 184, 189, 193, 173/200–201, 204, 207, 21, 218
See application file for complete search history.

(56) References Cited

U.S. PATENT DOCUMENTS

| | | | |
|---|---|---|---|
| 4,282,937 A * | 8/1981 | Hibbard | E21C 27/28 173/1 |
| 4,508,817 A | 4/1985 | Ohno et al. | |
| 4,665,703 A * | 5/1987 | David | F01B 3/0079 123/46 R |
| 2008/0247891 A1* | 10/2008 | Domberger | F02M 63/0225 123/495 |
| 2008/0283260 A1* | 11/2008 | Kramer | B25D 17/26 173/128 |
| 2010/0155096 A1* | 6/2010 | Morrison | E21B 1/02 173/206 |
| 2010/0193212 A1* | 8/2010 | Konecnik | B25D 9/20 173/218 |
| 2011/0000695 A1* | 1/2011 | Saf | E21B 1/02 173/201 |
| 2015/0068782 A1 | 3/2015 | Mellwig et al. | |
| 2015/0122117 A1* | 5/2015 | Jonsson | E21B 1/02 92/165 R |
| 2015/0143686 A1* | 5/2015 | Blacket | B21J 15/26 29/525.06 |
| 2015/0158166 A1* | 6/2015 | Schlesak | B25D 11/005 173/112 |
| 2015/0375382 A1* | 12/2015 | Autschbach | B25D 9/12 173/20 |
| 2016/0138728 A1* | 5/2016 | Hämäläinen | B25D 9/20 251/12 |
| 2017/0001293 A1* | 1/2017 | Matsuda | B25D 9/20 |
| 2019/0351538 A1* | 11/2019 | Piras | B25D 9/12 |

FOREIGN PATENT DOCUMENTS

| | | |
|---|---|---|
| FR | 998513 A | 1/1952 |
| WO | 2008095073 A2 | 8/2008 |
| WO | 2011123020 A1 | 10/2011 |
| WO | 2014003626 A1 | 1/2014 |

OTHER PUBLICATIONS

International Search Report for Application No. PCT/FR2017/052579.
Written Opinion for Application No. PCT/FR2017/052579.

* cited by examiner

PERCUSSION APPARATUS PROVIDED WITH A CENTERING DEVICE

CROSS REFERENCE TO RELATED APPLICATIONS

This application is a National Stage of PCT Application No. PCT/FR2017/052579 filed on Sep. 26, 2017, which claims priority to French Patent Application No. 16/59980 filed on Oct. 14, 2016, the contents each of which are incorporated herein by reference thereto.

TECHNICAL FIELD

The present invention concerns a percussion apparatus provided with a centering device.

BACKGROUND

A percussion apparatus, such as a hydraulic breaker, comprises in a known manner:
- a body comprising a piston cylinder,
- a striking piston mounted so as to be displaced alternately inside the piston cylinder, and arranged to strike a tool, and
- guide surfaces configured to guide the striking piston during its displacements in the piston cylinder.

When the percussion apparatus is equipped with a high mass striking piston, and in particular when the percussion apparatus is used in a non-vertical position, the striking piston may bear against the guide surfaces of the percussion apparatus. Such supports create intense frictions between the striking piston and the guide surfaces, and are likely to cause seizing of the striking piston, leading to a blockage of the percussion apparatus or even a permanent damage of the percussion apparatus.

In order to limit the risk of seizing of the striking piston, it is known to ensure a hydraulic flow between the striking piston and the guide surfaces. In general, this hydraulic flow is obtained by imposing a pressure differential at the axial ends of each guide surface, for example by connecting a first side of each guide surface to a high pressure fluid supply circuit, and a second side of each guide surface to a low pressure circuit. Such an arrangement generates a hydraulic flow in each guide surface, which promotes the creation of a hydraulic film between the striking piston and each guide surface.

Nevertheless, such an arrangement does not ensure a proper centering of the striking piston with respect to its guide surfaces, and often turns out to be ineffective for high mass striking pistons.

BRIEF SUMMARY

The present invention aims at overcoming these disadvantages.

The technical problem underlying the invention therefore consists in providing a percussion apparatus with a simple and economical structure, while avoiding any risk of seizing of the striking piston regardless of its mass.

To this end, the present invention concerns a percussion apparatus, including:
- a body comprising a piston cylinder,
- a striking piston mounted so as to be displaced alternately inside the piston cylinder and arranged to strike a tool,
- a guide surface configured to guide the striking piston during displacements of the striking piston in the piston cylinder, a functional clearance being provided between the guide surface and the striking piston;
- a high pressure fluid supply circuit and a low pressure circuit, a centering device configured to center the striking piston in the piston cylinder, the centering device comprising:
  - a plurality of centering chambers formed in the guide surface and distributed around the striking piston, each centering chamber being fluidly connected to the high pressure fluid supply circuit, and
  - two discharge grooves formed in the guide surface, each discharge groove being located proximate to the centering chambers and being fluidly connected to the low pressure circuit, the two discharge grooves being annular and extending around the striking piston and respectively on either side of the centering chambers.

Such a configuration of the percussion apparatus, and in particular of the centering device, makes it possible to hydraulically and effectively recenter the striking piston and thus to prevent the latter from coming into direct contact with its guide surface, and this, as soon as the percussion apparatus is pressurized, as well as during each striking cycle of the striking piston.

The percussion apparatus may further have one or more of the following features, considered alone or in combination.

According to an embodiment of the invention, the guide surface is annular.

According to an embodiment of the invention, each centering chamber is intended to be supplied with high pressure fluid, and more particularly each centering chamber is intended to be separately supplied with high pressure fluid.

According to an embodiment of the invention, each discharge groove extends at least partially along at least part of at least one of the centering chambers.

According to an embodiment of the invention, each discharge groove is configured to fluidly communicate with at least one of the centering chambers via the functional clearance provided between the guide surface and the striking piston.

According to an embodiment of the invention, the centering chambers are evenly distributed around the striking piston.

According to an embodiment of the invention, the centering chambers are equidistantly distributed with respect to the longitudinal axis of the striking piston.

According to an embodiment of the invention, each centering chamber has a height, considered in an axial direction of the striking piston, smaller than 30% of the height of the respective guide surface.

According to an embodiment of the invention, each centering chamber extends over an angular sector smaller than 30°.

According to an embodiment of the invention, the centering chambers are aligned on a same circumference of the guide surface. In other words, the centering chambers are substantially uniformly distributed around the striking piston.

According to an embodiment of the invention, the centering device is configured to supply each centering chamber with a substantially constant supply flow rate.

According to an embodiment of the invention, the centering device includes a plurality of connection channels each provided with a flow rate control member, each connection channel fluidly connecting the high pressure fluid supply circuit to a respective centering chamber.

According to an embodiment of the invention, each flow rate control member consists of a calibrated orifice.

According to an embodiment of the invention, the centering device includes a plurality of discharge channels, each discharge channel fluidly connecting the low pressure circuit to a respective discharge groove.

According to an embodiment of the invention, each discharge channel opens into the bottom of a respective discharge groove.

According to an embodiment of the invention, the percussion apparatus further comprises a control distributor configured to control an alternating movement of the striking piston inside the piston cylinder alternately following a strike stroke and a return stroke.

According to an embodiment of the invention, the striking piston and the piston cylinder delimit a first control chamber permanently connected to the high pressure fluid supply circuit and a second control chamber, the control distributor being configured to alternately put the second control chamber in connection with the high pressure fluid supply circuit and the low pressure circuit. Thus, the centering chambers and the first control chamber are advantageously connected to the same supply circuit and the discharge grooves and the second control chamber are configured to be connected to the same return circuit. However, the centering chambers and the first control chamber could be connected to different supply circuits and the discharge grooves and the second control chamber could also be configured to be connected to different return circuits.

According to an embodiment of the invention, the percussion apparatus includes a supply channel fluidly connecting the high pressure fluid supply circuit and the first control chamber, each connection channel opening respectively into the supply channel and into the respective centering chamber.

According to an embodiment of the invention, each calibrated orifice opens into the respective centering chamber, and more particularly into the bottom surface of the respective centering chamber.

According to an embodiment of the invention, the high pressure fluid supply circuit consists of an incompressible hydraulic fluid supply circuit.

According to an embodiment of the invention, the percussion apparatus comprises an additional guide surface axially offset with respect to the guide surface.

According to an embodiment of the invention, the guide surface and the additional guide surface are disposed on either side of the first control chamber. According to an embodiment of the invention, one of the guide surface and the additional guide surface is disposed between the first and the second control chambers.

According to an embodiment of the invention, the functional clearance provided between the guide surface and the striking piston is in the range of a few hundredths of a millimeter.

According to an embodiment of the invention, each centering chamber has a generally rectangular shape.

BRIEF DESCRIPTION OF THE DRAWINGS

Anyway the invention will be better understood using the following description with reference to the appended schematic drawings representing, as a non-limiting example, an embodiment of this percussion apparatus.

DETAILED DESCRIPTION

Figure 1:
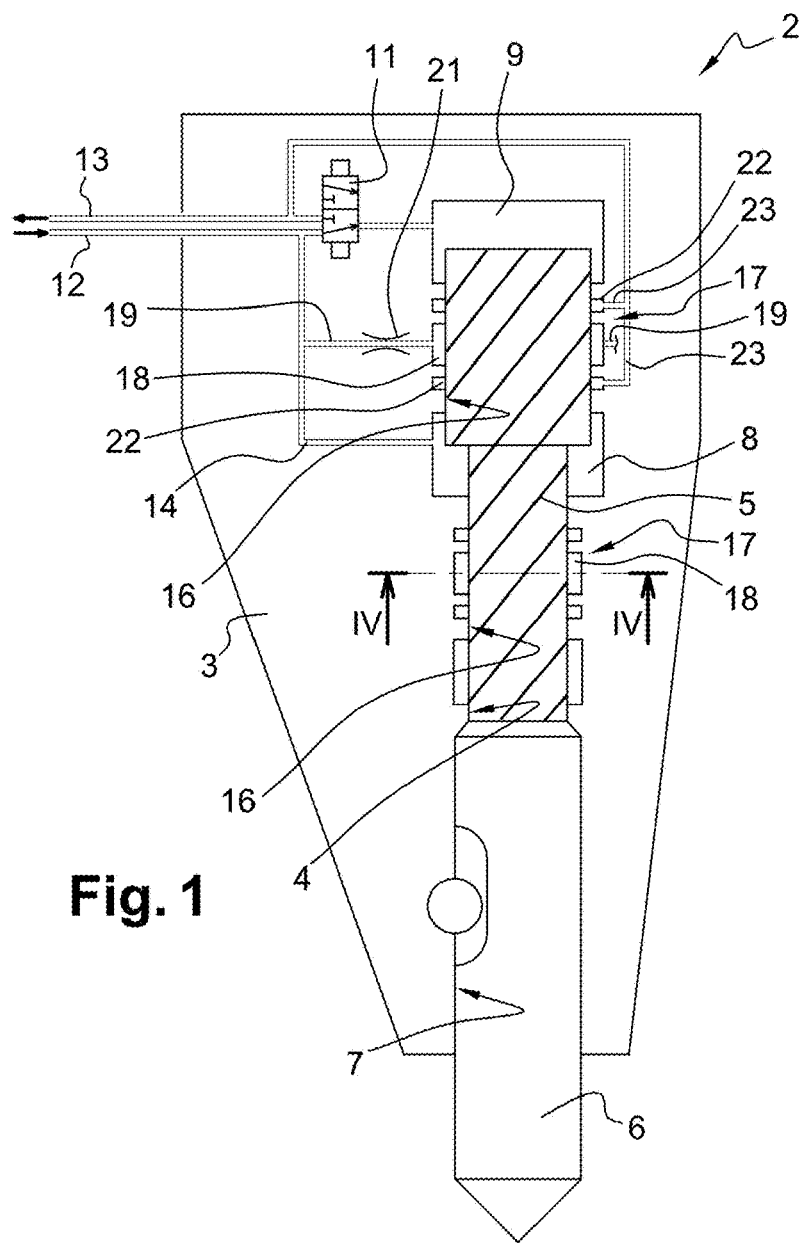
FIG. 1 is a schematic longitudinal sectional view of a percussion apparatus according to the invention.
Figure 2:
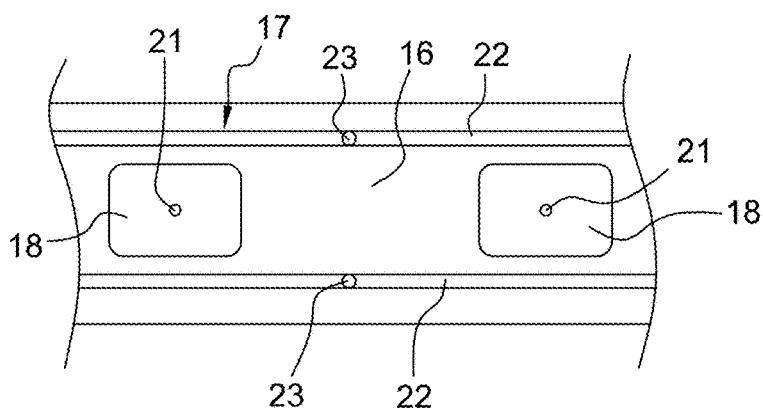
FIG. 2 is a partial view of a guide surface the percussion apparatus of FIG. 1.
Figure 3:
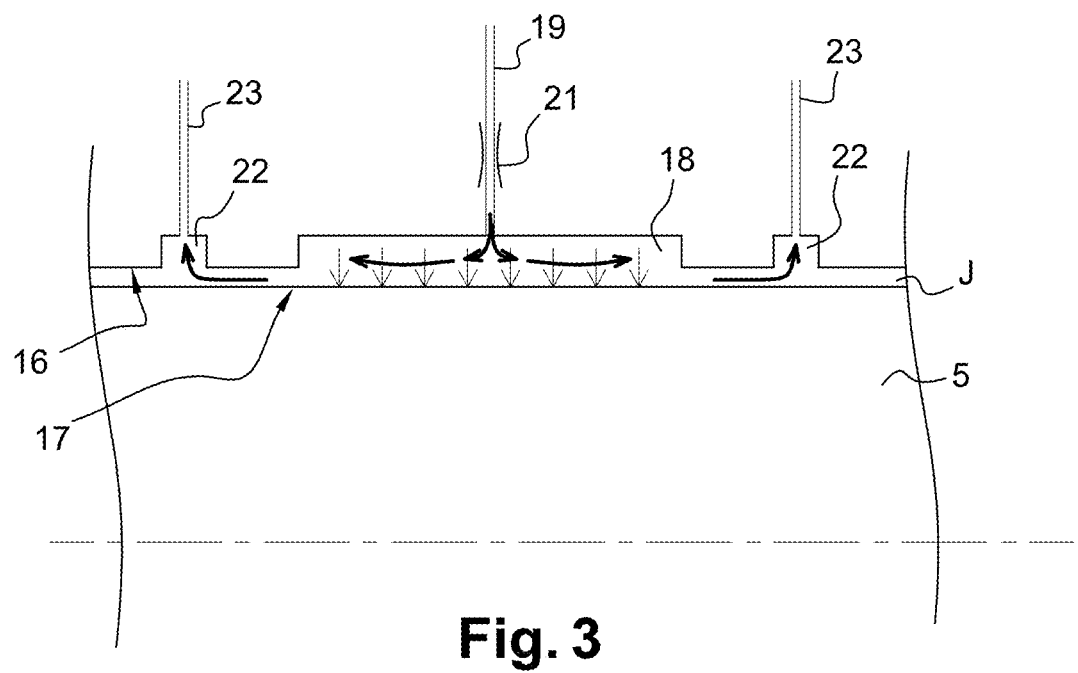
FIG. 3 is a partial sectional view along the line III-III of FIG. 2.
Figure 4:
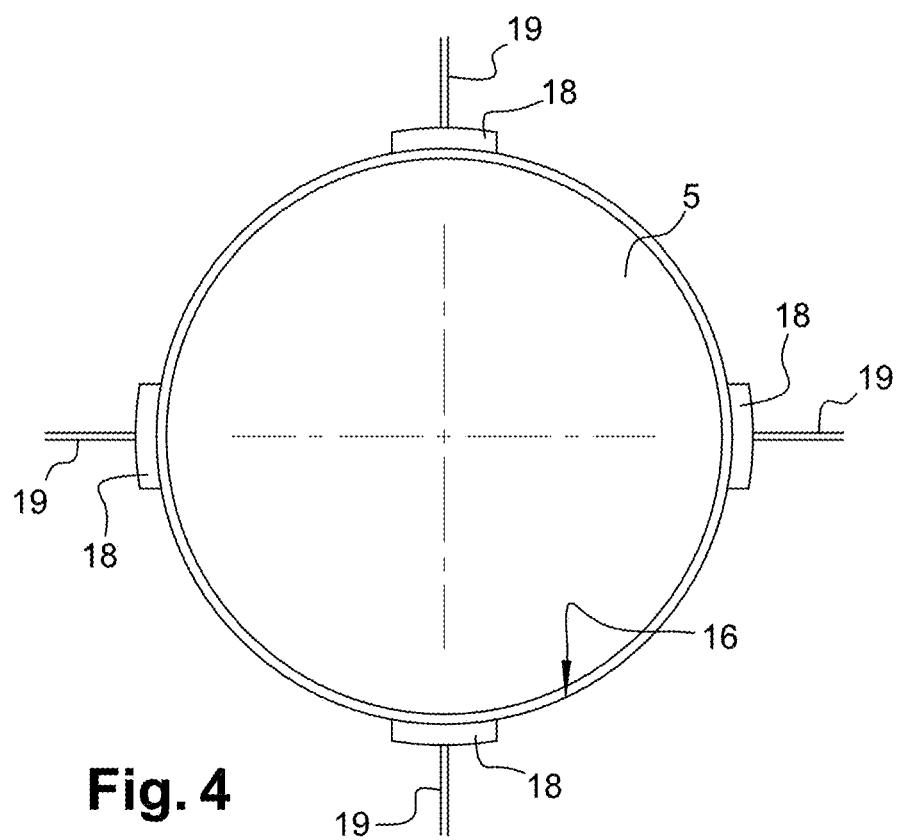
FIG. 4 is a sectional view along the line IV-IV of FIG. 1.

The percussion apparatus 2, represented in FIGS. 1 to 4 and also called hydraulic breaker, comprises a body 3 including a piston cylinder 4, and a stepped striking piston 5, slidably mounted alternately inside the piston cylinder 4. During each operation cycle of the percussion apparatus 2, the striking piston 5 is intended to strike against the upper end of a tool 6 slidably mounted in a bore 7 formed in the body 3 coaxially to the piston cylinder 4. It should be noted that the piston cylinder 4 may be directly formed in the body 3 or be formed in an attached part in the body 3.

As shown in FIG. 1, the striking piston 5 and the piston cylinder 4 delimit an annular first control chamber 8, called the lower chamber, and a second control chamber 9, called the upper chamber, with a larger section disposed above the striking piston 5.

The percussion apparatus 2 further comprises a control distributor 11 arranged to control an alternating movement of the striking piston 5 inside the piston cylinder 4 alternately following a strike stroke and a return stroke. The control distributor 11 is configured to alternately put the second control chamber 9 in connection with a high pressure fluid supply circuit 12, such as an incompressible hydraulic fluid supply circuit, during the strike stroke of the striking piston 5, and with a low pressure circuit 13 during the return stroke of the striking piston 5.

More particularly, the control distributor 11 is movably mounted in a bore formed in the body 3 between a first position (see FIG. 1) in which the control distributor 11 is configured to put the second control chamber 9 in connection with the high pressure fluid supply circuit 12 and a second position in which the control distributor 11 is configured to put the second control chamber 9 in connection with the low pressure circuit 13.

The first control chamber 8 is permanently supplied with high pressure fluid by a supply channel 14, such that each position of the control distributor 11 causes the strike stroke of the striking piston 5 and then the return stroke of the striking piston 5. The supply channel 14 may advantageously be connected to an accumulator (not represented in the figures).

The percussion apparatus 2 also comprises two guide surfaces 16, which are annular, configured to guide the striking piston 5 during the displacements of the striking piston 5 in the piston cylinder 4. As shown more particularly in FIG. 3, a functional clearance J, for example of a few hundredths of a millimeter, is provided between the striking piston 5 and each guide surface 16. According to the embodiment represented in the figures, the two guide surfaces 16 are axially offset with respect to one another, and are disposed on either side of the first control chamber 8.

Each guide surface 16 advantageously includes a centering device 17 configured to center the striking piston 5 in the piston cylinder 4.

Each centering device 17 comprises in particular a plurality of centering chambers 18, for example four centering chambers 18, formed in the respective guide surface 16 and evenly distributed around the striking piston 5. According to the embodiment represented in the figures, the centering chambers 18 of each centering device 17 are equidistantly distributed with respect to the longitudinal axis of the striking piston 5, and are aligned on the same circumference of the respective guide surface 16.

According to an embodiment of the invention, each centering chamber 18 has a height, considered in an axial direction of the striking piston 5, smaller than 30% of the height of the respective guide surface 16, and extends over an angular sector smaller than 30°. Each centering chamber 18 may for example have a generally rectangular shape or any other different shape.

Each centering chamber 18 is fluidly connected to the high pressure fluid supply circuit 12, and is intended to be separately supplied with high pressure fluid. According to the embodiment represented in the figures, each centering device 17 includes a plurality of connection channels 19 each fluidly connecting the high pressure fluid supply circuit 12 to a respective centering chamber 18, and each connection channel 19 is provided with a flow rate control member 21, such as a calibrated orifice, and is thus configured to supply the respective centering chamber 18 with a substantially constant supply flow rate. Advantageously, each connection channel 19 includes a first end opening into the supply channel 14 and a second end opening into the bottom surface of the respective centering chamber 18.

Each centering device 17 also comprises a plurality of discharge grooves 22 formed in the respective guide surface 16. According to the embodiment represented in the figures, each centering device 17 comprises two discharge grooves 22 which are annular and which extend around the striking piston 5 and respectively on either side of the respective centering chambers 18. Advantageously, each discharge groove extends proximate to at least part of each of the centering chambers 18 of the respective centering device 17, and is configured to fluidly communicate with each of the centering chambers 18 of the respective centering device 17 via the functional clearance provided between the respective guide surface 16 and the striking piston 5.

Each discharge groove 22 is fluidly connected to the low pressure circuit 13. According to the embodiment represented in the figures, each centering device 17 comprises a plurality of discharge channels 23 each fluidly connecting the low pressure circuit 13 to a respective discharge groove 22. Advantageously, each discharge channel 23 opens into the bottom of the respective discharge groove 22.

When the percussion apparatus 2 is operating, each centering chamber 18 is supplied with high pressure fluid through the respective connection channel 19, and the flow rate of fluid injected into each centering chamber 18 is substantially constant because of the presence of a flow rate control member 21 on each connection channel 19. As shown more particularly in FIG. 3, the high pressure fluid injected into each centering chamber 18 flows to the outside of the respective centering chamber 18 via the functional clearance J between the striking piston 5 and the respective guide surface 16, then penetrates into the discharge grooves 22 and flows towards the low pressure circuit 13 via discharge channels 23.

Since the flow rate of fluid injected into each centering chamber 18 is substantially constant, if the functional clearance J at the level of a centering chamber 18 decreases, due to a lateral displacement of the striking piston 5, then the passage for the flow of the high pressure fluid outside said centering chamber 18 will decrease and the pressure prevailing in said centering chamber 18 will increase, and conversely, if the functional clearance J at the level of a centering chamber 18 increases, also due to a lateral displacement of the striking piston 5, then the passage for the flow of the high pressure fluid outside said centering chamber 18 will increase and the pressure prevailing in said centering chamber 18 will decrease.

Thus, the thrust force exerted by each centering chamber 18 on the striking piston 5 depends on the value of the functional clearance J at the level of this centering chamber 18, and will be even higher as the value of the functional clearance J at the level of this centering chamber 18 will be low. In particular, when the value of the functional clearance J at the level of a centering chamber 18 decreases, then the centering chamber 18 tends to push back the striking piston 5.

It is obvious that any misalignment between the axis of the striking piston 5 and the axis of a guide surface 16 reduces the functional clearance J of one side of the striking piston 5 and increases it on the other side of the striking piston 5. Therefore, in case of such a misalignment of the striking piston 5, the centering chambers 18 located on the decreasing side of the functional clearance J will impart, on the striking piston 5, an increased radial thrust force whereas the centering chambers 18 on the increasing side of the functional clearance J will impart a reduced radial thrust force. These arrangements have the effect of permanently recentring the striking piston 5 with respect to the guide surfaces 16, and therefore avoiding any seizing of the striking piston 5.

It goes without saying that the invention is not limited to the sole embodiment of this percussion apparatus, described above as an example, on the contrary, it encompasses all variants thereof. Thus, in particular, each centering device could include more or less than four centering chambers 18.

The invention claimed is:

1. A percussion apparatus, including:
a body comprising a piston cylinder,
a striking piston displaceably mounted inside the piston cylinder, and configured to strike a tool,
a guide surface provided on the body and configured to guide the striking piston during displacements of the striking piston in the piston cylinder, a radial functional clearance being provided between the guide surface and an outer surface of the striking piston,
a high pressure fluid supply circuit and a low pressure circuit,
a first control chamber which is delimited by the striking piston and the piston cylinder and which is permanently connected to the high pressure fluid supply circuit, the first control chamber being axially offset with respect to the guide surface,
a second control chamber which is delimited by the striking piston and the piston cylinder and which is axially offset with respect to the guide surface,
a control distributor configured to control an alternating movement of the striking piston inside the piston cylinder alternately following a strike stroke and a return stroke, the control distributor being configured to alternately put the second control chamber in connection with the high pressure fluid supply circuit and the low pressure circuit, and
a centering device configured to center the striking piston in the piston cylinder, the centering device comprising:
a plurality of centering chambers formed in the guide surface and distributed around the striking piston, each centering chamber being permanently fluidly connected to the high pressure fluid supply circuit, the centering chambers being aligned on a same circumference of the guide surface, two discharge grooves formed in the guide surface, the two discharge grooves being annular and extending around the striking piston and respectively on either side of the centering chambers, each discharge groove being located proximate to the centering chambers and being permanently fluidly connected to the low pressure circuit, and a plurality of connection channels each emerging in a respective centering chamber, each connection channel being provided with a respective calibrated orifice, each connection channel permanently fluidly connecting the high pressure fluid supply circuit to the respective centering chamber.

2. The percussion apparatus according to claim 1, wherein the centering chambers are evenly distributed around the striking piston.

3. The percussion apparatus according to claim 1, wherein the centering device is configured to supply each centering chamber with a substantially constant supply flow rate.

4. The percussion apparatus according to claim 1, wherein the centering device includes a plurality of discharge channels, each discharge channel fluidly connecting the low pressure circuit to a respective discharge groove.

5. The percussion apparatus according to claim 1, which comprises an additional guide surface axially offset with respect to the guide surface.

6. The percussion apparatus according to claim 2, wherein the centering chambers are aligned on a same circumference of the guide surface.

7. The percussion apparatus according to claim 2, wherein the centering device is configured to supply each centering chamber with a substantially constant supply flow rate.

8. The percussion apparatus according to claim 3, wherein the centering device is configured to supply each centering chamber with a substantially constant supply flow rate.

9. The percussion apparatus according to claim 6, wherein the centering device is configured to supply each centering chamber with a substantially constant supply flow rate.

10. The percussion apparatus according to claim 1, wherein each of the centering chambers is located opposite the outer surface of the striking piston and emerges directly in the piston cylinder.

11. The percussion apparatus according to claim 1, wherein each centering chamber extends over an angular sector, centered on a longitudinal axis of the striking piston, smaller than 30°.

12. The percussion apparatus according to claim 1, wherein the centering chambers are configured to be separately supplied with high pressure fluid.

13. The percussion apparatus according to claim 1, wherein each centering chamber includes a bottom surface which is outwardly radially shifted with respect to the guide surface.

14. A percussion apparatus, including:
a body comprising a piston cylinder,
a striking piston displaceably mounted inside the piston cylinder, and configured to strike a tool,
a guide surface provided on the body and configured to guide the striking piston during displacements of the striking piston in the piston cylinder, a radial functional clearance being provided between the guide surface and an outer surface of the striking piston,
a high pressure fluid supply circuit and a low pressure circuit,
a first control chamber which is delimited by the striking piston and the piston cylinder and which is permanently connected to the high pressure fluid supply circuit, the first control chamber being axially offset with respect to the guide surface,
a second control chamber which is delimited by the striking piston and the piston cylinder and which is axially offset with respect to the guide surface,
a control distributor configured to control an alternating movement of the striking piston inside the piston cylinder alternately following a strike stroke and a return stroke, the control distributor being configured to alternately put the second control chamber in connection with the high pressure fluid supply circuit and the low pressure circuit, and
a centering device configured to center the striking piston in the piston cylinder, the centering device comprising:
a plurality of centering chambers formed in the guide surface and distributed around the striking piston, each centering chamber being permanently fluidly connected to the high pressure fluid supply circuit, each centering chamber extending over an angular sector, centered on a longitudinal axis of the striking piston, smaller than 30°,
two discharge grooves formed in the guide surface, the two discharge grooves being annular and extending around the striking piston and respectively on either side of the centering chambers, each discharge groove being located proximate to the centering chambers and being permanently fluidly connected to the low pressure circuit, and
a plurality of connection channels each emerging in a respective centering chamber, each connection channel being provided with a respective calibrated orifice, each connection channel permanently fluidly connecting the high pressure fluid supply circuit to the respective centering chamber.

15. A percussion apparatus, including:
a body comprising a piston cylinder,
a striking piston displaceably mounted inside the piston cylinder, and configured to strike a tool,
a guide surface provided on the body and configured to guide the striking piston during displacements of the striking piston in the piston cylinder, a radial functional clearance being provided between the guide surface and an outer surface of the striking piston,
a high pressure fluid supply circuit and a low pressure circuit,
a first control chamber which is delimited by the striking piston and the piston cylinder and which is permanently connected to the high pressure fluid supply circuit, the first control chamber being axially offset with respect to the guide surface,
a second control chamber which is delimited by the striking piston and the piston cylinder and which is axially offset with respect to the guide surface,
a control distributor configured to control an alternating movement of the striking piston inside the piston cylinder alternately following a strike stroke and a return stroke, the control distributor being configured to alternately put the second control chamber in connection with the high pressure fluid supply circuit and the low pressure circuit, and
a centering device configured to center the striking piston in the piston cylinder, the centering device comprising:
a plurality of centering chambers formed in the guide surface and distributed around the striking piston, each centering chamber being permanently fluidly connected to the high pressure fluid supply circuit, each centering chamber including a bottom surface which is outwardly radially shifted with respect to the guide surface, two discharge grooves formed in the guide surface, the two discharge grooves being annular and extending around the striking piston and respectively on either side of the centering chambers, each discharge groove being located proximate to the centering chambers and being permanently fluidly connected to the low pressure circuit, and a plurality of connection channels each emerging in a respective centering chamber, each connection channel being provided with a respective calibrated orifice, each connection channel permanently fluidly connecting the high pressure fluid supply circuit to the respective centering chamber.

* * * * *